US012704820B2

(12) United States Patent
Liu et al.

(10) Patent No.: US 12,704,820 B2
(45) Date of Patent: Aug. 11, 2026

(54) CONTROLLER, CONTROL METHOD, AND COMPUTER-READABLE RECORDING MEDIUM FOR CONTROLLING CONTROLLED OBJECT WITH TRAINED MODEL

(71) Applicant: YOKOGAWA ELECTRIC CORPORATION, Musashino (JP)

(72) Inventors: Zhuo Liu, Tokyo (JP); Hiroaki Kanokogi, Tokyo (JP); Go Takami, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 208 days.

(21) Appl. No.: 17/679,632

(22) Filed: Feb. 24, 2022

(65) Prior Publication Data

US 2022/0299950 A1 Sep. 22, 2022

(30) Foreign Application Priority Data

Mar. 17, 2021 (JP) ................................ 2021-043802

(51) Int. Cl.
*G05B 13/04* (2006.01)
*G05B 13/02* (2006.01)

(52) U.S. Cl.
CPC ....... *G05B 13/042* (2013.01); *G05B 13/0265* (2013.01)

(58) Field of Classification Search
CPC .............. G05B 13/042; G05B 13/0265; G05B 2219/33027; G06N 3/0455
See application file for complete search history.

(56) References Cited

U.S. PATENT DOCUMENTS 5,570,282 A 10/1996 Hansen et al.
2006/0020423 A1 * 1/2006 Sharpe, Jr. ........... G05B 13/024 702/183

(Continued)

FOREIGN PATENT DOCUMENTS

EP 3 693 798 A1 8/2020
JP H06-262234 A 9/1994

(Continued)

OTHER PUBLICATIONS

Extended European Search Report dated Jul. 20, 2022, issued in counterpart EP application No. 22158515.1. (8 pages).

(Continued)

*Primary Examiner* — Nicholas Klicos
(74) *Attorney, Agent, or Firm* — WHDA, LLP

(57) ABSTRACT

A controller includes: an acquisition unit configured to acquire process data for an actually used controlled object; and a calculation unit configured to, based on at least one of a target set value and parameters for the actually used controlled object, convert the process data acquired by the acquisition unit, and calculate a manipulated variable for the actually used controlled object by use of the converted process data and a trained model. Upon receiving input of process data for a specific controlled object, the trained model outputs a manipulated variable for approximating process data for the specific controlled object to a specific target set value. The parameters include parameters for specifying the relation between manipulated variables for the actually used controlled object and process data obtained by use of the manipulated variables.

12 Claims, 7 Drawing Sheets

2

| FEATURE DATA | | | AMOUNT OF CHANGE IN MANIPULATED VALIABLE (Action) | WEIGHT (Weight) |
|---|---|---|---|---|
| State_1 | State_2 | | | |
| 0.00 | 80 | | 0 | -1426.27 |
| 0.31 | 81 | | -3 | 687.7613 |
| 0.73 | 78 | | -3 | 34.89822 |
| 1.48 | 75 | | 0 | 1366.38 |
| 4.43 | 72 | | 3 | -524.928 |
| 41.51 | 68 | | -3 | 332.7196 |
| 42.72 | 65 | | 1 | -127.872 |
| 46.48 | 69 | | 0 | 2288.698 |
| 48.73 | 72 | | 3 | -1577.28 |
| 48.90 | 75 | ... | -1 | 752.8989 |
| 52.39 | 67 | | -3 | 1199.246 |
| 50.24 | 61 | | 1 | -2532.74 |
| 50.91 | 80 | | 3 | -107.319 |
| 42.87 | 51 | | -3 | -254.507 |
| 40.39 | 47 | | 3 | -266.796 |
| 25.41 | 27 | | 1 | -438.846 |
| 19.39 | 11 | | -1 | -451.135 |
| 17.15 | 16 | | 3 | -463.425 |
| 10.25 | 11 | | 0 | -488.003 |
| 1.90 | 19 | | 1 | -512.582 |
| 8.94 | 5 | | 3 | -524.871 |
| ⋮ | | | ⋮ | |

(56) References Cited

U.S. PATENT DOCUMENTS

2007/0234781 A1* 10/2007 Yamada ............ G05B 13/0265 73/23.2
2011/0276180 A1* 11/2011 Seem ................ G05B 13/0265 700/32
2014/0337256 A1* 11/2014 Varadi ................... G05B 13/04 706/12
2017/0068257 A1* 3/2017 Quinones ........... G01F 25/0092
2017/0090428 A1* 3/2017 Oohara ................. G06N 5/045
2019/0187631 A1* 6/2019 Badgwell .............. G06N 3/006
2019/0219293 A1* 7/2019 Wenzel ................. G06Q 50/06
2019/0252985 A1* 8/2019 Radic ............... H02M 3/33515
2019/0361415 A1* 11/2019 Sakai .................. G05B 19/042
2020/0026246 A1* 1/2020 Nakagawa ......... G05B 13/0265
2021/0004699 A1* 1/2021 Okuno .................. G06N 20/20
2021/0089887 A1* 3/2021 Johnson ................ G06N 3/084
2021/0264269 A1* 8/2021 Sato ...................... G06N 3/088
2022/0028063 A1* 1/2022 Guendel ............... G06N 20/00

FOREIGN PATENT DOCUMENTS

JP 2001-188602 A 7/2001
JP 2018-202564 A 12/2018
JP 2021-18825 A 2/2021
JP 6833133 B1 2/2021
WO 2018/179191 A1 10/2018

OTHER PUBLICATIONS

Office Action dated Jul. 11, 2023, issued in counterpart JP application No. 2021-043802, with English translation. (6 pages).

Office Action dated Apr. 11, 2023, issued in counterpart JP application No. 2021-043802, with English translation. (5 pages).

* cited by examiner

| FEATURE DATA | | | AMOUNT OF CHANGE IN MANIPULATED VALIABLE (Action) | WEIGHT (Weight) |
|---|---|---|---|---|
| State_1 | State_2 | | | |
| 0.00 | 80 | | 0 | -1426.27 |
| 0.31 | 81 | | -3 | 687.7613 |
| 0.73 | 78 | | -3 | 34.89822 |
| 1.48 | 75 | | 0 | 1366.38 |
| 4.43 | 72 | | 3 | -524.928 |
| 41.51 | 68 | | -3 | 332.7196 |
| 42.72 | 65 | | 1 | -127.872 |
| 46.48 | 69 | | 0 | 2288.698 |
| 48.73 | 72 | | 3 | -1577.28 |
| 48.90 | 75 | ... | -1 | 752.8989 |
| 52.39 | 67 | | -3 | 1199.246 |
| 50.24 | 61 | | 1 | -2532.74 |
| 50.91 | 80 | | 3 | -107.319 |
| 42.87 | 51 | | -3 | -254.507 |
| 40.39 | 47 | | 3 | -266.796 |
| 25.41 | 27 | | 1 | -438.846 |
| 19.39 | 11 | | -1 | -451.135 |
| 17.15 | 16 | | 3 | -463.425 |
| 10.25 | 11 | | 0 | -488.003 |
| 1.90 | 19 | | 1 | -512.582 |
| 8.94 | 5 | | 3 | -524.871 |
| ⋮ | | | ⋮ | |

FIG.4

| FEATURE DATA | | AMOUNT OF CHANGE IN MANIPULATED VALIABLE (Action) |
| --- | --- | --- |
| State_1 | State_2 | |
| 20 | 40 | -3 |
| 20 | 40 | -1 |
| 20 | 40 | 0 |
| 20 | 40 | 1 |
| 20 | 40 | 3 |

FIG.5

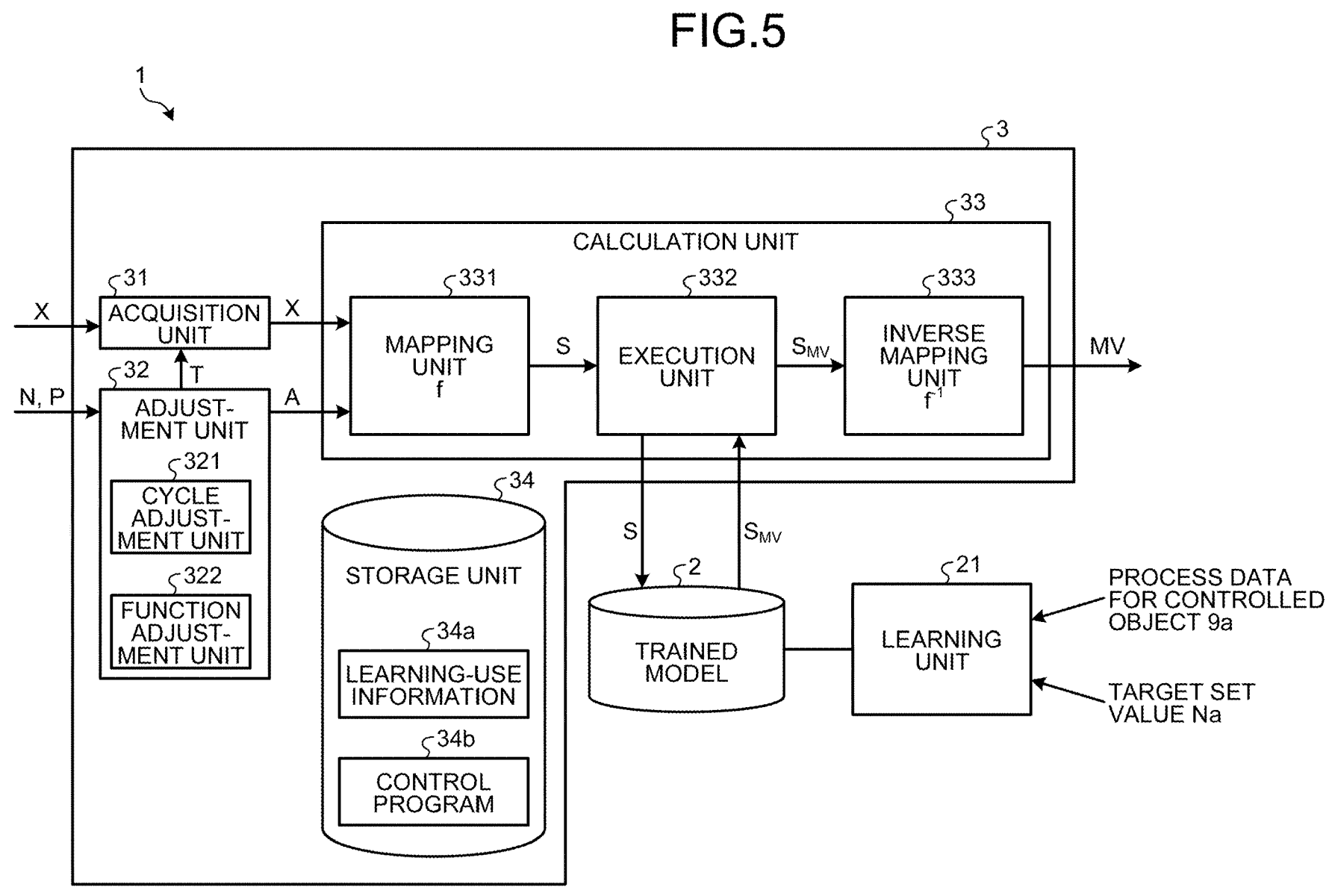

1
3
33
CALCULATION UNIT
331 MAPPING UNIT f
332 EXECUTION UNIT
333 INVERSE MAPPING UNIT $f^{-1}$
S
$S_{MV}$
MV
31 ACQUISITION UNIT
32 ADJUSTMENT UNIT
321 CYCLE ADJUSTMENT UNIT
322 FUNCTION ADJUSTMENT UNIT
X
N, P
T
A
2 TRAINED MODEL
21 LEARNING UNIT
PROCESS DATA FOR CONTROLLED OBJECT 9a
TARGET SET VALUE Na
34 STORAGE UNIT
34a LEARNING-USE INFORMATION
34b CONTROL PROGRAM

FIG.6

MAPPING

X $x_1$ $x_2$ $x_3$

S $s_1$ $s_2$ $s_3$

CONTROLLER, CONTROL METHOD, AND COMPUTER-READABLE RECORDING MEDIUM FOR CONTROLLING CONTROLLED OBJECT WITH TRAINED MODEL

CROSS-REFERENCE TO RELATED APPLICATION

The present application claims priority to and incorporates by reference the entire contents of Japanese Patent Application No. 2021-043802 filed in Japan on Mar. 17, 2021.

FIELD

The present invention relates to a controller, a control method, and a computer-readable recording medium.

BACKGROUND

A controller that uses a trained model has been proposed (see, for example, Japanese Patent Application Laid-open No. 2018-202564).

For example, a trained model to be used in process control is obtained through learning under conditions of a specific controlled object and a specific target set value. Such a trained model lacks versatility and practicality because the model is not capable of performing appropriate control when conditions are changed to different ones.

The present invention is directed to enhancing the versatility and practicality of a trained model.

SUMMARY

According to one aspect of embodiments, a controller comprises an acquisition unit configured to acquire process data for an actually used controlled object; and a calculation unit configured to, based on at least one of a target set value and parameters for the actually used controlled object, convert the process data acquired by the acquisition unit, and calculate a manipulated variable for the actually used controlled object by use of the converted process data and a trained model, wherein upon receiving input of process data for a specific controlled object, the trained model outputs a manipulated variable for approximating process data for the specific controlled object to a specific target set value, and the parameters include parameters for specifying a relation between manipulated variables for the actually used controlled object and process data obtained by use of the manipulated variables.

According to one aspect of embodiments, a control method comprises acquiring process data for an actually used controlled object; and converting the acquired process data based on at least one of a target set value and parameters for the actually used controlled object and calculating, by use of the converted process data and a trained model, a manipulated variable for the actually used controlled object, wherein upon receiving input of process data for a specific controlled object, the trained model outputs a manipulated variable for approximating process data for the specific controlled object to a specific target set value, and the parameters include parameters for specifying a relation between manipulated variables for the actually used controlled object and process data obtained by use of the manipulated variable.

According to one aspect of embodiments, a computer-readable recording medium stores therein a control program configured to cause a computer to execute: acquiring process data for an actually used controlled object; and converting the acquired process data based on at least one of a target set value and parameters for the actually used controlled object and calculating, by use of the converted process data and a trained model, a manipulated variable for the actually used controlled object, wherein upon receiving input of process data for a specific controlled object, the trained model outputs a manipulated variable for approximating process data for the specific controlled object to a specific target set value, and the parameters include parameters for specifying a relation between manipulated variables for the actually used controlled object and process data obtained by use of the manipulated variables.

BRIEF DESCRIPTION OF THE DRAWINGS

FIG. 3 is a view schematically illustrating an example of the schematic configuration of a trained model;

FIG. 4 is a view illustrating an example of determination of amount of change in manipulated variable;

FIG. 5 is a view illustrating an example of the schematic configuration of an AI controller;

FIG. 6 is a view schematically illustrating an example of mapping using a mapping function;

DESCRIPTION OF EMBODIMENTS

The following describes an embodiment with reference to the drawings. The same reference signs are given to the same elements, and duplicated descriptions are omitted.

Figure 1:
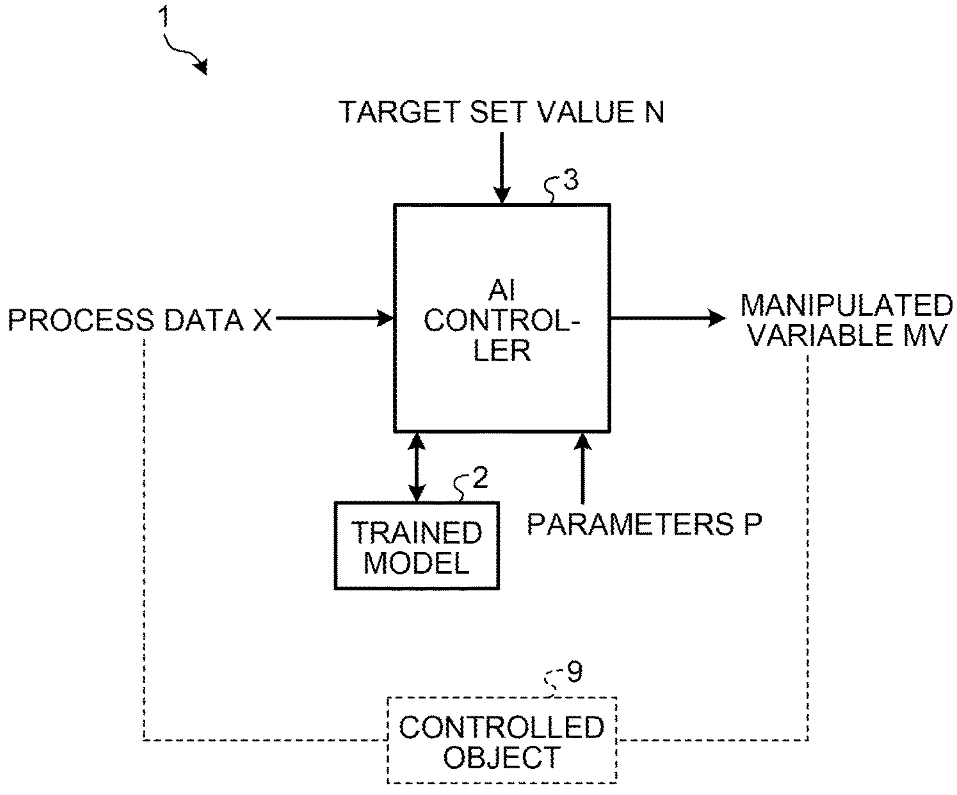
FIG. 1 is a view illustrating an example of the schematic configuration of a controller according to an embodiment.

FIG. 1 is a view illustrating an example of the schematic configuration of a controller according to an embodiment. This controller 1 controls a controlled object 9. An example of the control is a process control in a plant. In that case, various controlled objects to be subjected to the process control can each be the controlled object 9. The controller 1 illustrated includes a trained model 2 and an artificial intelligence (AI) controller 3.

The controller 1 acquires process data X for the controlled object 9 and calculates a manipulated variable MV by which the process data X can be approximated to a target set value N. The calculated manipulated variable MV is fed to the controlled object 9, whereby the controlled object 9 is controlled.

Some examples of the process data X and the manipulated variable MV are described. For example, when the controlled object 9 is a water tank, the process data X may be a liquid surface level or the like. The liquid level (water level) of the liquid in the tank, the flow rate of fluid flowing in the pipe, or the like may be the process data X. The manipulated variable MV may be the degree of opening, the degree of rotation, the amount of shift, or the like of a valve. When the controlled object 9 is a furnace or the like, the process data X may be the temperature of the furnace (for example, the entirety thereof). The manipulated variable MV may be, for example, the value of current supplied to a heating wire.

The manipulated variable MV may be the absolute value of a manipulated variable or may be an amount of change in manipulated variable that is currently being applied. The trained model 2 is described with reference to FIG. 2 to FIG. 4 as well.

Figure 2:
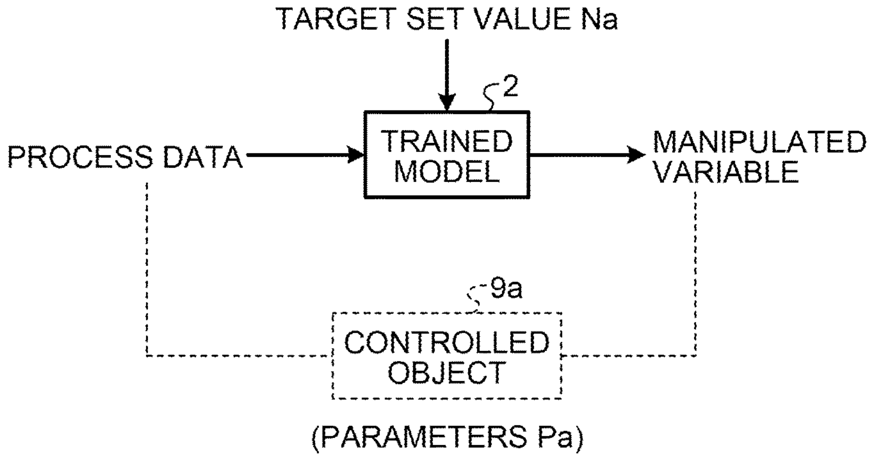
FIG. 2 is a view schematically illustrating an example of learning used for a trained model.

FIG. 2 is a view schematically illustrating an example of learning used for a trained model. The trained model 2 is an AI-controlled model obtained through learning (generated) so as to be able to, when process data for a specific controlled object 9*a* is input thereto, output a manipulated variable for approximating the process data for the controlled object 9*a* to a specific target set value Na. Parameters Pa in FIG. 2 are one or more parameters for the controlled object 9*a*. Parameters are described down below.

FIG. 3 is a view schematically illustrating an example of the schematic configuration of a trained model. The trained model 2 stores a policy therein based on which a manipulated variable for the controlled object 9*a* is determined that is needed for control for approximating a current process state to the target set value Na. Specifically, the trained model 2 retains a plurality of pieces of sample data. In this example, the pieces of sample data describe "feature data", "amount of change in manipulated variable", and "weights" in association with one another.

The "feature data" represents a state (such as the water level, the degree of opening of a valve) of a process of the controlled object 9*a*. A piece of sample data may include a plurality of pieces of feature data, which are schematically indicated as "State_1", "State_2", and the like in FIG. 3. The "amount of change in manipulated variable" (Action) is the amount of a change in operation performed on the controlled object 9*a* in accordance with the current state of a process. The "weight" (Weight) represents an evaluation of a combination of the corresponding feature data and the corresponding amount of change in manipulated variable.

A known reinforcement learning algorithm such as kernel dynamic policy programming (KDPP) may be used for generation of the above-described trained model 2. An optimum amount of change in manipulated variable that corresponds to the current process state is determined by use of the trained model 2. A specific example is described with reference to FIG. 4.

FIG. 4 is a view illustrating an example of determination of the amount of change in manipulated variable. State_1 included in the feature data is a water level in a tank, the value of which is 20. State_2 is the degree of opening of a valve, the value of which is 40. Alternatives for the corresponding amounts of change in manipulated variable are −3, −1, 0, 1, and 3. A kernel calculation is performed between each alternative (with respect to each row) and, for example, each piece of the sample data (except for those in the column of the weight) illustrated in FIG. 3 described above. The result of the calculation is multiplied by the corresponding weight for addition. An evaluation value for each of the amounts of change in manipulated variable given as the alternatives is thus obtained. The amount of change in manipulated variable that corresponds to the highest evaluation value is determined to be the next amount of change in manipulated variable.

Referring back to FIG. 1, the AI controller 3 calculates the manipulated variable MV by use of the above-described trained model 2. Parameters P as well as the target set value N are fed to the AI controller 3. On the basis of the principle described below, the AI controller 3 calculates the manipulated variable MV for various combinations of the controlled objects 9 and the target set values N by use of the same trained model 2. For example, even when the controlled object 9 is different from the controlled object 9*a*, the manipulated variable MV for that controlled object 9 is calculated by use of the trained model 2. Even when the target set value N is different from the target set value Na while the controlled object 9 is the same as the controlled object 9*a*, the manipulated variable MV for that controlled object 9 is calculated by use of the trained model 2. Even when the controlled object 9 is different from the controlled object 9*a* and the target set value N is different from the target set value Na, the manipulated variable MV for that controlled object 9 is also calculated by use of the trained model 2. The AI controller 3 is described with reference to FIG. 5 as well.

FIG. 5 is a view illustrating an example of the schematic configuration of the AI controller. The AI controller 3 includes an acquisition unit 31, an adjustment unit 32, a calculation unit 33, and a storage unit 34. Other than the trained model 2 described above, a learning unit 21 is illustrated. The learning unit 21 performs learning to obtain the trained model 2. In the learning, learning data that contains the process data and the target set value Na for the controlled object 9*a* is used. The trained model 2 obtained through learning performed by the learning unit 21 can be used by the AI controller 3.

The acquisition unit 31 acquires the process data X for the controlled object 9. For example, the acquisition unit 31 acquires the process data X for the controlled object 9 in control cycles T. The control cycles T are adjusted by the adjustment unit 32 described below.

The adjustment unit 32 uses the trained model 2 to make various adjustments needed for calculating the manipulated variable MV for the controlled object 9. The target set value N and the parameters P are fed to the adjustment unit 32.

The target set value N is a target value of the process data X, as described above. For example, when the process data X is a temperature, the target set value N is a target temperature (such as 50° C. or 100° C.)

The parameters P are parameters representing a feature of control for the controlled object 9. For example, the parameters P may be parameters for specifying the relation between a manipulated variable for the controlled object 9 and process data (also referred to as a controlled amount or the like) obtained by use of the manipulated variable. The relation (input-output characteristic) between a manipulated variable and obtained process data is also referred to as a transfer characteristic in, for example, proportional, integral, and differential (PID) control. Specific examples of the parameters P as described herein include input and output ranges, a process gain, and a time constant. For example, the input and output ranges represent ranges of a manipulated variable and process data. The process gain represents a value obtained by dividing process data by a manipulated variable. The time constant represents, for example, a first-order lag time constant. The same applies to the parameters Pa (FIG. 2) for the controlled object 9*a* when the trained model 2 is obtained through learning described above.

The target set values N and the parameters P are different by the different controlled objects 9.

Therefore, the target set values N and the parameters P (for different controlled objects) that correspond to the controlled objects 9 that are actually used are fed to the adjustment unit 32. The meanings of "the target set values N for different controlled objects" herein include different target set values for the same controlled object 9. These target set values N and the parameters P may be fed through user operation, or may be automatically fed, for example, with reference to a data table that has at least one of the target set values N and the parameters P for the different controlled objects 9 entered therein.

Specific adjustments that are made by the adjustment unit 32 are described. As functional blocks for specific adjustments, the adjustment unit 32 includes a cycle adjustment unit 321 and a function adjustment unit 322.

The cycle adjustment unit 321 adjusts (i.e., determines or updates, for example) a control cycle T, based on a time constant included as the parameters P fed thereto. The control cycle T, as described above, is a cycle in which the acquisition unit 31 acquires the process data X once. The control cycle T can be a calculation cycle described down below in which the calculation unit 33 calculates the manipulated variable MV once. Appropriate control corresponding to the response speed or the like of the controlled object 9 is performed through acquiring the process data X, calculating the manipulated variable MV, and controlling the controlled object 9, in the control cycles T based on the time constant. For example, the cycle adjustment unit 321 may adjust the control cycle T in such a manner that the control cycle T is smaller for a smaller value of the time constant. This is because a smaller value of the time constant means that control at shorter intervals is needed. The control cycle T may be adjusted in proportion to the value of the time constant.

The function adjustment unit 322 adjusts a mapping function f based on at least one of the target set value N and the parameters P that have been fed thereto. The mapping function f maps (converts), onto the feature data S, the process data X acquired by the acquisition unit 31.

Figure 6:
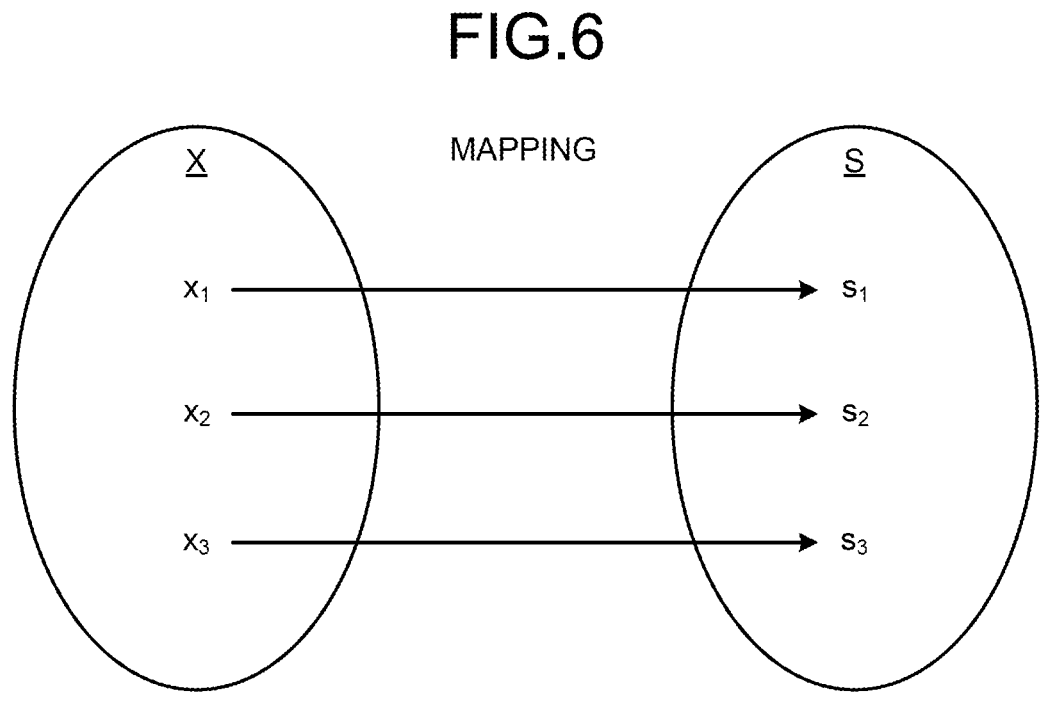

FIG. 6 is a view schematically illustrating an example of mapping using a mapping function. The process data X is schematically illustrated as, for example, "x1", "x2", and "x3". The feature data S is schematically illustrated as, for example, "s1", "s2", and "s3". In this example, the process data x1, the process data x2, and the process data x3 are mapped (converted) onto the feature data s1, the feature data s2, and the feature data s3, respectively. The mapping is not limited to one-to-one injective mapping as illustrated herein and may be surjective mapping.

For example, suppose that the mapping function f performs linear mapping and that the mapping function f is given as f(x)=Ax using a coefficient vector A. When the process data X is (x1, x2), the feature data S (s1, s2) is obtained in the following manner. Coefficients a1 to a4 in the following equation represent components of the coefficient vector A.

$$\begin{bmatrix} s1 \\ s2 \end{bmatrix} = Ax = \begin{bmatrix} a1 & a2 \\ a3 & a4 \end{bmatrix} \begin{bmatrix} x1 \\ x2 \end{bmatrix} = \begin{bmatrix} a1x1 + a2x2 \\ a3x1 + a4x2 \end{bmatrix} \tag{1}$$

The above coefficient vector A is adjusted by the function adjustment unit 322. Specifically, the function adjustment unit 322 adjusts the coefficient vector A based on at least one of the target set value N and the parameters P that have been fed thereto and at least one of the target set value Na and the parameters Pa (the target set value and the parameters when the trained model 2 is obtained through learning).

When it is assumed that the target set value N and the parameters P are equal to the target set value Na and the parameters Pa, the coefficient vector A is adjusted in the following manner.

$$A = \begin{bmatrix} 1 & 0 \\ 0 & 1 \end{bmatrix} \tag{2}$$

In the above case, the feature data S is identical to the process data X. In reality, however, it is often the case that the target set value N and the parameters P are different from the target set value Na and the parameters Pa. In such cases, data different from the process data X is obtained as the feature data S.

The function adjustment unit 322 adjusts the coefficient vector A based on the result of comparison (such as the ratio) between at least one of the target set value N and the parameters P and at least one of the target set value Na and the parameters Pa. For example, when the specific target set values Na for the specific controlled objects 9*a* are smaller than the target set value N for the controlled object 9, the function adjustment unit 322 adjusts the coefficient vector A so that the feature data S can be smaller than the process data X. When the ratio of the specific target set values Na for the specific controlled objects 9*a* to the target set value N for the controlled object 9 is 1:2, the adjustment unit 32 may adjust the coefficient vector A so that the feature data S can be 0.5 times (one half of) the process data X. The coefficient vector A given below is obtained.

$$A = \begin{bmatrix} 0.5 & 0 \\ 0 & 0.5 \end{bmatrix} \tag{3}$$

For the same purpose, when the parameters P and the parameters Pa have different values, the function adjustment unit 322 also adjusts the coefficient vector A based on the result of comparison (such as the ratio) therebetween. For example, the coefficient vector A is adjusted based on the ratio between a process gain included in the parameters P and a process gain included in the parameters Pa or based on the ratios between input and output ranges included in the controlled object 9 and input and output ranges included in the parameters Pa.

An adjustment of the coefficient vector A may be manually made by a user operation. Hyperparameters for the trained model 2 may be manually adjusted.

The function adjustment unit 322 adjusts the mapping function f, for example, in the above-described manner. The function adjustment unit 322 also adjusts an inverse mapping function $f^{-1}$. The inverse mapping function $f^{-1}$ is the inverse function of the mapping function f and is adjusted by use of the inverse matrix or the like of the above-described coefficient vector A.

Referring back to FIG. 5, the calculation unit 33 calculates the manipulated variable MV by use of the process data X acquired by the acquisition unit 31 and the trained model 2. As functional blocks for calculation, the calculation unit 33 includes a mapping unit 331, an execution unit 332, and an inverse mapping unit 333.

By use of the mapping function f adjusted by the function adjustment unit 322, the mapping unit 331 maps (converts), onto the feature data S, the process data X acquired by the acquisition unit 31.

The execution unit 332 inputs, to the trained model 2, the feature data S that has been obtained as a result of the mapping performed by the mapping unit 331. The trained model 2 provides, as alternatives, manipulated variables (amounts of change in manipulated variable) that correspond to the input feature data S, for example, in the manner described above with reference to FIGS. 2 and 3. Those alternatives are associated with the weights and calculations such as multiplications or additions are made therebetween, whereby evaluation values are obtained. The manipulated variable that corresponds to the highest evaluation value is determined to be the feature data $S_{MV}$. The calculations (such as multiplications or additions) needed for determination of the feature data $S_{MV}$ may be executed in the trained model 2 or may be executed by the execution unit 332. In any cases, the execution unit 332 acquires the feature data $S_{MV}$ from the trained model 2.

By use of the inverse mapping function $f^{-1}$ adjusted by the function adjustment unit 322, the inverse mapping unit 333 inversely maps (inversely converts), onto the manipulated variable MV, the feature data $S_{MV}$ acquired by the execution unit 332.

The calculation unit 33 calculates the manipulated variable MV, for example, in the above-described manner. The calculation unit 33 controls the controlled object 9 by feeding (outputting) the calculated manipulated variable MV to the controlled object 9.

The storage unit 34 stores therein various kinds of information needed for processing to be executed in the AI controller 3. As the information to be stored, learning-use information 34*a* and a control program 34*b* are listed as examples. The learning-use information 34*a* is information used when the trained model 2 is obtained through learning and includes the target set value Na and the parameters Pa, which are described above with reference to FIG. 2. The control program 34*b* is a computer program that causes a computer to execute processing in the AI controller 3.

The storage unit 34 may function as a storage unit not only for the AI controller 3 but also for the controller 1. The control program 34*b* may be a computer program for causing a computer to execute processing in the controller 1.

Figure 7:
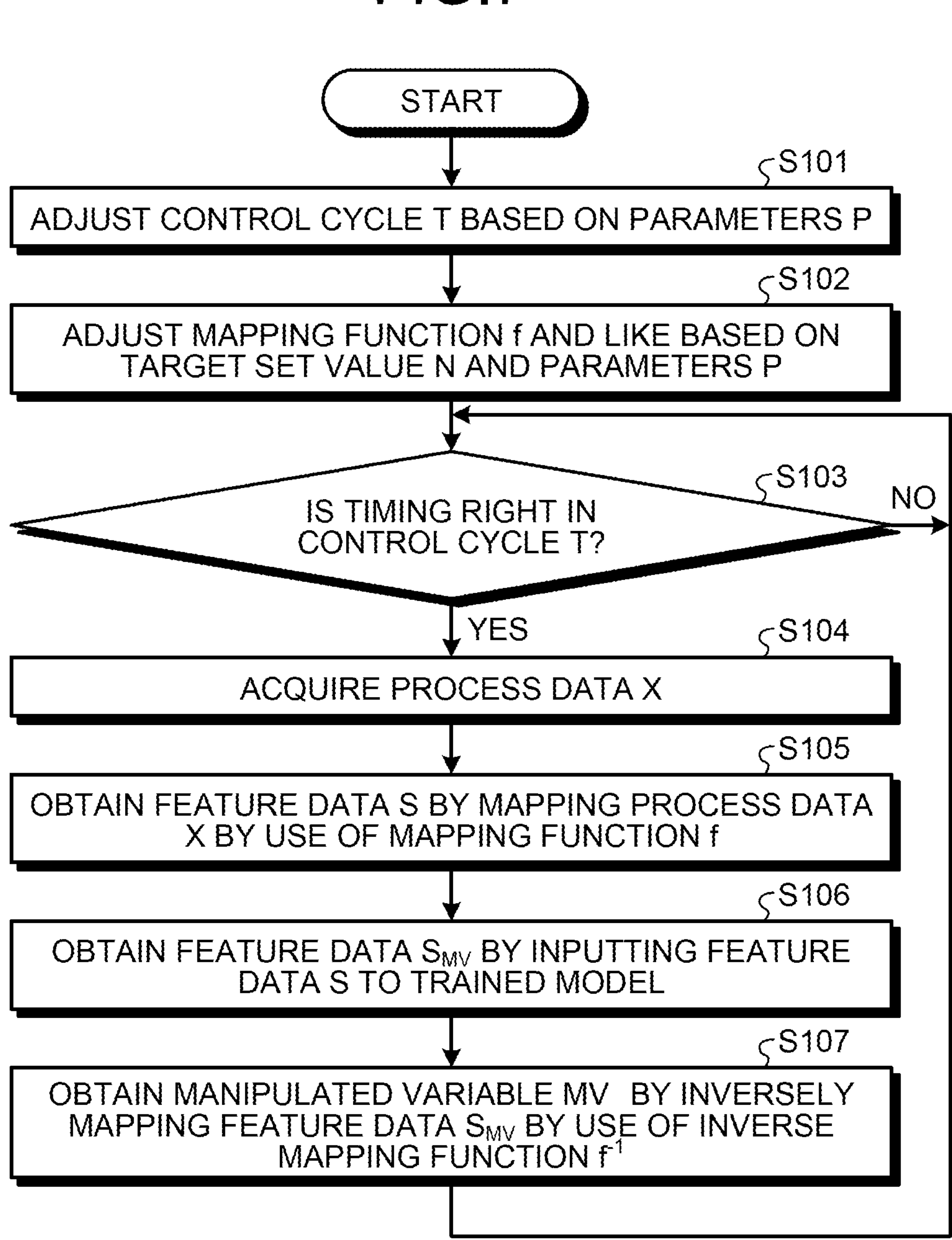
FIG. 7 is a flowchart illustrating an example of processing that is executed in the controller.

FIG. 7 is a flowchart illustrating an example of processing (a control method) that is executed in the controller. Descriptions overlapping with the above descriptions are omitted as appropriate.

At Step S101, the control cycle T is adjusted based on the parameters P. The cycle adjustment unit 321 adjusts the control cycle T based on the time constant included in the parameters P fed thereto.

At Step S102, the mapping function f and the like are adjusted based on the target set value N and the parameters P. The function adjustment unit 322 adjusts the mapping function f and the inverse mapping function $f^{-1}$ based on at least one of the target set value N and the parameters P that have been fed thereto.

At Step S103, processing flows into two alternative branches because processing at Steps S104 to S107 needs to be repeatedly executed in the control cycles T adjusted earlier at Step S101. If it is the right timing in the control cycle T (Yes at Step S103), processing proceeds to Step S104. If it is not the right timing in the control cycle T (No at Step S103), processing does not proceed further. This determination may be made by, for example, the acquisition unit 31.

At Step S104, the process data X is acquired.

The acquisition unit 31 acquires the process data X for the controlled object 9.

At Step S105, the process data X is mapped by use of the mapping function f, whereby the feature data S is obtained. By use of the mapping function f adjusted earlier at Step S102, the mapping unit 331 of the calculation unit 33 maps (converts), onto the feature data 5, the process data X acquired earlier at Step S104.

At Step S106, the feature data S is input to the trained model 2, whereby the feature data $S_{MV}$ is obtained. The execution unit 332 of the calculation unit 33 inputs the feature data S, acquired earlier at Step S105, to the trained model 2. The manipulated variable that corresponds to the highest evaluation value is determined to be the feature data $S_{MV}$ and is obtained.

At Step S107, the feature data $S_{MV}$ is inversely mapped by use of the inverse mapping function $f^{-1}$, whereby the manipulated variable MV is obtained. By use of the inverse mapping function $f^{-1}$ adjusted earlier at Step S102, the inverse mapping unit 333 of the calculation unit 33 obtains the manipulated variable MV by inversely mapping (inversely converting) the feature data $S_{MV}$ obtained earlier at Step S106.

The manipulated variable MV for the controlled object 9 is calculated by use of the trained model 2, for example, in the above-described manner. The calculated manipulated variable MV is fed (output) to the controlled object 9, whereby the controlled object 9 is controlled. The processing at Step S101 and Step S102 described above may be executed in the opposite order or may be executed concurrently (in parallel).

According to the above-described controller 1, even when the actually used controlled object 9 is different from the specific controlled object 9*a* or when the target set value N for the controlled object 9 is different from the target set value Na for the controlled object 9*a*, the manipulated variable MV for the controlled object 9 can be calculated by use of the trained model 2 obtained through learning on the controlled object 9*a*. The different controlled objects 9 that are actually used have the variously different target set values N and the variously different parameters P because of difference in facility renewal, change in production plan, and the like. However, the same trained model 2 can be used for all of the controlled objects 9 and all of the target set values N. Thus, the versatility and practicality of the trained model 2 can be enhanced.

An embodiment of the present disclosure is described above. The technique disclosed herein is not limited to the above embodiment. Some modifications are described hereinbelow.

In one embodiment, the AI controller may be used in a form integrated with a PID controller. An example of such a hybrid-type controller is described with reference to FIG. 8 as well.

Figure 8:
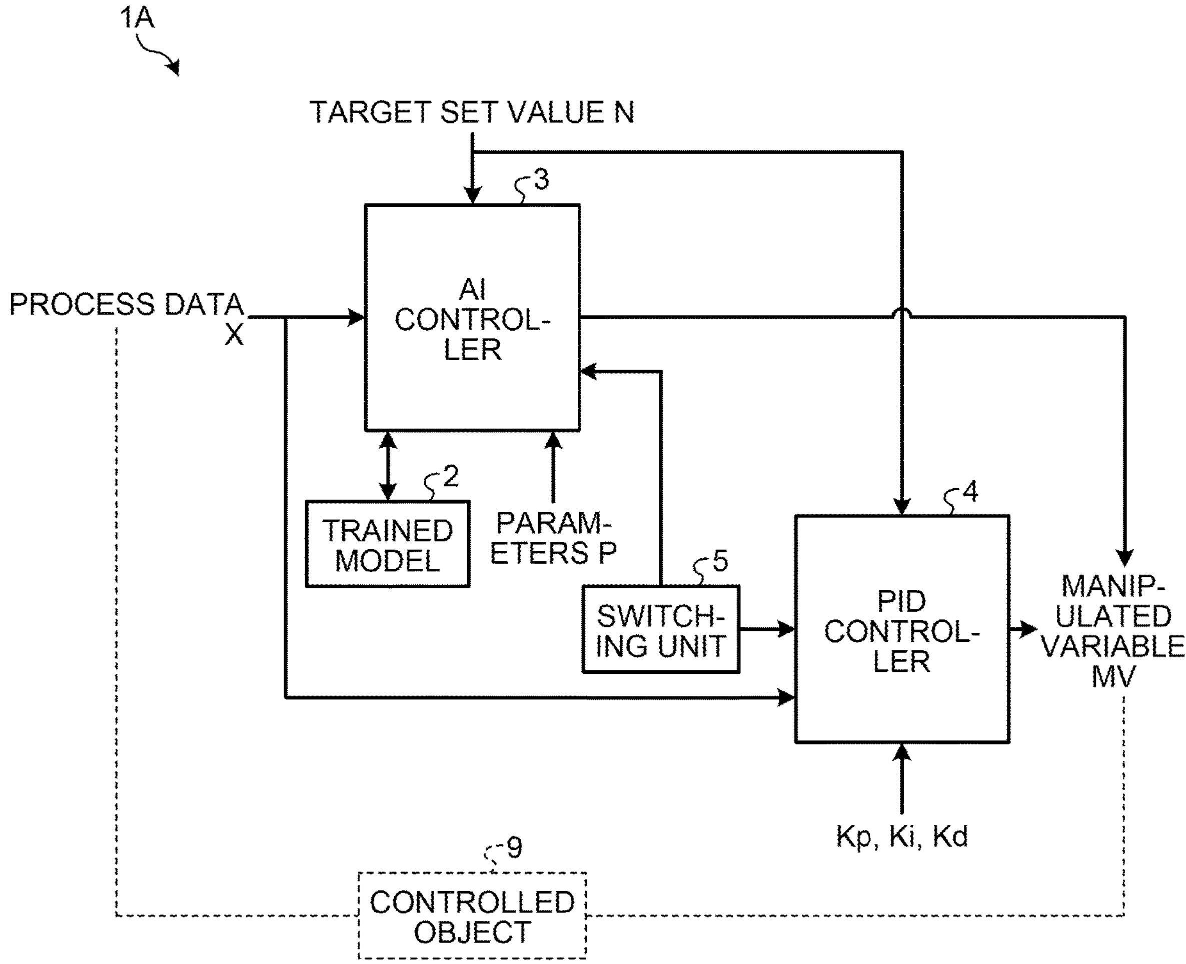
FIG. 8 is a view illustrating an example of the schematic configuration of a controller according to a modification.

FIG. 8 is a view illustrating an example of the schematic configuration of a controller according to a modification. A controller 1A illustrated therein is different from the controller 1 (FIG. 1) in that the controller 1A further includes a PID controller 4 and a switching unit 5.

The PID controller 4 also calculates the manipulated variable MV for the controlled object 9. Specifically, the PID controller 4 calculates the manipulated variable MV that approximates the difference between the process data X and the target set value N to 0. The calculation is made based on, for example, the following equation.

$$u(t) = K_p e(t) + K_i \int_0^t e(\tau)d\tau + K_d \frac{de(t)}{dt} \tag{4}$$

In the above equation, e(t) and u(t) correspond to the process data X (controlled amount) and the manipulated variable MV, respectively. Kp, Ki, and Kd denote a P gain, an I gain, and a D gain (PID gains). Kp, Ki, and Kd may be constants. Each of these values may be determined, for example, based on empirical values or theoretical values and on-site calibration.

In the above-described controller 1A that additionally includes the PID controller 4, two control modes can be used: a first control mode under which the controlled object 9 is controlled by use of the AI controller 3; and a second control mode under which the controlled object 9 is controlled by use of the PID controller 4.

The switching unit 5 switches a control mode between the first control mode and the second control mode. For example, the switching unit 5 outputs, to the AI controller 3 and the PID controller 4, a signal indicating that the control mode be switched to the first control mode. Thus, the control mode is switched to the first control mode under which the manipulated variable MV calculated by (the calculation unit 33 of) the AI controller 3 is fed to the controlled object 9. The PID controller 4 may be stopped from operating under the first control mode. The switching unit 5 outputs, to the AI controller 3 and the PID controller 4, a signal indicating that the control mode be switched to the second control mode. Thus, the control mode is switched to the second control mode under which the manipulated variable MV calculated by the PID controller 4 is fed to the controlled object 9. The AI controller 3 may be stopped from operating under the second control mode. The switching conducted by the switching unit 5 between the first control mode and the second control mode may be automatically performed or may be manually performed in response to a user operation or the like.

When the PID controller 4 is used, control of approximating the process data X to the target set value N can be performed. However, it is often the case that at least one of an overshoot and an undershoot at the startup occurs. For example, when an overshoot occurs in temperature control, the problem of having the start of production delayed occurs as a result of a slow decrease in temperature. In contrast, when the PID gains are adjusted so that an overshoot can be avoided, it takes a long time to approximate the process data X to the target set value N. It takes time and trouble to make an optimum PID gain adjustment. Depending on changes in conditions or the like, another PID gain adjustment (retuning) may be needed.

In contrast, by use of the trained model 2 that has been obtained through learning so that a target set value can be reached faster while an overshoot as described above and the like can be prevented from occurring, the AI controller 3 can perform control improved to overcome the above-described drawback of the PID controller 4.

For example, the switching unit 5 may switch the control mode to the first control mode (control to be performed by the AI controller 3) at the startup. This is because it is often the case that the use of the AI controller 3 is preferable at the startup of a water level and a furnace temperature because it is difficult for the PID controller 4 to perform optimum control. In contrast, the switching unit 5 may switch the control mode to the second control mode (control to be performed by the PID controller 4) when a value under control is close to the target set value N. This is because versatile control performed by the PID controller 4 is sufficient. The process data X can be thereby quickly stabilized in a value close to the target set value N with the above-described overshoot or the like prevented, for example.

According to the controller 1A, the precision of control for the controlled object 9 can be more improved precision than, for example, in a case where the trained model 2 and only the AI controller 3 are used and than in a case where only the PID controller 4 is used.

In an embodiment, the trained model 2 may be provided in the AI controller 3. For example, the trained model 2 may be stored in the storage unit 34 of the AI controller 3. The learning unit 21 may also be provided in the AI controller 3. For example, in the AI controller 3, the trained model 2 generated through learning under conditions of a certain controlled object and a certain target set value can be used in control under conditions of a controlled object that is the same as the certain controlled object and a target set value that is different from the certain target set value.

In one embodiment, processing that is executed by the controller 1 (or the controller 1A) may be implemented by cloud computing or the like. For example, the trained model 2, and some or all of the functions of the acquisition unit 31, the adjustment unit 32, the calculation unit 33, and the storage unit 34 of the AI controller 3 may be provided in an apparatus outside the controller 1. The controller 1 may execute the above-described processing by communicating with such an outside apparatus.

An example where the process data X is converted by use of the mapping function f is described in the above embodiment. However, the embodiment is not limited to the mapping function f, and any approach that can convert the process data X may be used.

A time constant, input and output ranges, and process gains are provided as examples of the parameters P in the descriptions of the above embodiment. However, these examples are not limiting, and any parameters that can represent a feature of control on the controlled object 9 can be used as the parameters P.

An example where the trained model 2 includes a configuration that retains the pieces of sample data is described in the above embodiment. However, a trained model that includes any configuration that enables outputting a manipulated variable for approximating process data for the specific controlled object 9*a* to the specific target set value Na may be used as the trained model 2.

Figure 9:
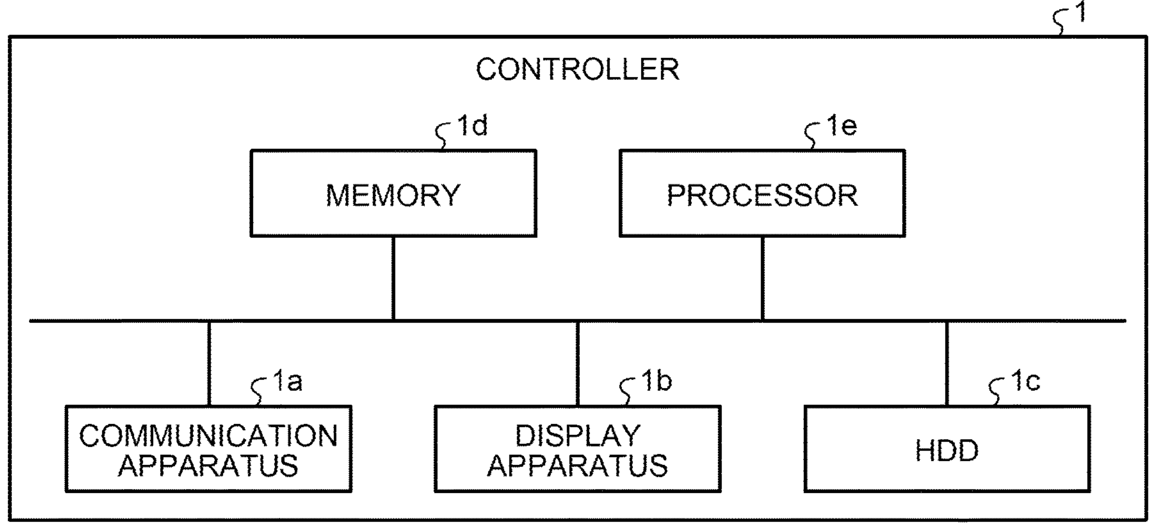
FIG. 9 is a view illustrating an example of the hardware configuration of a controller.

FIG. 9 is a view illustrating an example of the hardware configuration of a controller. A computer or the like that includes the illustrated hardware configuration functions as the above-described controller 1 (or the controller 1A). In this example, the controller 1 includes a communication apparatus 1*a*, a display apparatus 1*b*, a hard disk drive (HDD) 1*c*, a memory 1*d*, and a processor 1*e* that are connected to one another via a bus or the like.

The communication apparatus 1*a* is a network interface card or the like and enables communication with another apparatus. The display apparatus 1*b* is, for example, a touch panel or a display. The HDD 1*c* functions as the storage unit 34 and stores therein, for example, the control program 34*b*.

The processor 1*e* reads out the control program 34*b* from the HDD 1*c* or the like and loads the control program 34*b* into the memory 1*d*, thereby causing a computer to function as the controller 1. Functions include the function of the acquisition unit 31, the function of the adjustment unit 32, and the function of the calculation unit 33 that are as described above.

The control program 34*b* can be distributed via a network such as the Internet. The control program 34*b* can also be recorded on a computer-readable recording medium such as a hard disk, a flexible disk (FD), a compact disc read-only memory (CD-ROM), a magneto-optical disk (MO), or a digital versatile disc (DVD) and be read out from the recording medium by a computer to be executed.

The above-described technique is specified, for example, in the following manner. The controller 1 includes the acquisition unit 31 and the calculation unit 33 as described with reference to, for example, FIGS. 1 to 7. The acquisition unit 31 acquires the process data X for the actually used controlled object 9. Based on at least one of the target set value N and the parameters P (such as the input and output ranges, and the process gains) for the actually used controlled object 9, the calculation unit 33 converts the process data X acquired by the acquisition unit 31, and uses the converted process data (feature data S) and the trained model 2 to calculate the manipulated variable MV for the actually used controlled object 9. Upon receiving input of process data for the specific controlled object 9*a*, the trained model 2 outputs a manipulated variable for approximating the process data for the specific controlled object 9*a* to the specific target set value Na. The parameters P include parameters for specifying the relation between a manipulated variable for the actually used controlled object 9 and process data obtained with the manipulated variable. The controller 1 may include the learning unit 21 that performs learning to obtain the trained model 2.

According to the above controller 1, even when the actually used controlled object 9 is different from the specific controlled object 9*a* or when the target set value N for the controlled object 9 is different from the target set value Na for the controlled object 9*a*, the manipulated variable MV for the controlled object 9 can be calculated by use of the trained model 2 obtained through learning on the controlled object 9*a*. The different controlled objects 9 that are actually used have the variously different target set values N and the variously different parameters P because of difference in facility renewal, change in production plan, and the like. However, the same trained model 2 can be used for all of the controlled objects 9 and all of the target set values N. Thus, the versatility and practicality of the trained model 2 can be enhanced.

As described with reference to, for example, FIG. 5, the calculation unit 33 may convert the process data X, acquired by the acquisition unit 31, by use of the mapping function f adjusted by the function adjustment unit 322 while the controller 1 may include the function adjustment unit 322 that adjusts the mapping function f based on the result of comparison (such as the ratio) between: at least one of the target set value N and the parameters P for the actually used controlled object 9; and at least one of the specific target set value Na for the specific controlled objects 9*a* and the parameters Pa for the specific controlled objects 9*a*. The process data X can be appropriately converted by use of, for example, the mapping function f of this kind. The calculation unit 33 may calculate the manipulated variable MV for the actually used controlled object 9 by performing, on data (the feature data $S_{MV}$) calculated by use of the converted process data (the feature data S) and the trained model 2, inverse conversion (inverse mapping using the inverse mapping function $f^{-1}$) that is inverse to the above conversion.

The parameters P may include a time constant, the controller 1 may include the cycle adjustment unit 321 that adjusts the control cycle T based on the time constant included among the parameters P, and the acquisition unit 31 may acquire process data for the actually used controlled object 9 in the control cycles T adjusted by the cycle adjustment unit 321. The controlled object 9 can be controlled in the appropriate control cycles T.

As described above with reference to, for example, FIG. 8, the controller 1 may include: the PID controller 4 that calculates the manipulated variable MV for the actually used controlled object 9; and the switching unit 5 that switches a control mode between the first control mode, under which the manipulated variable MV calculated by the calculation unit 33 (of the AI controller 3) is fed to the actually used controlled object 9, and the second control mode, under which the manipulated variable MV calculated by the PID controller 4 is fed to the actually used controlled object 9. The precision of control for the controlled object 9 is more likely to be further enhanced than, for example, in a case where only the AI controller 3 or only the PID controller 4 is used.

The control method described with reference to, for example, FIG. 7 also forms an embodiment. The control method includes: acquiring the process data X for the actually used controlled object 9 (Step S104); and, after converting the acquired process data X based on at least one of the target set value N and the parameters P for the actually used controlled object 9, calculating the manipulated variable MV for the actually used controlled object 9 by use of the converted process data (the feature data S) and the trained model 2 (Steps S105 to S107). The control method of this kind can also enhance the versatility and practicality of the trained model 2 as described above.

The control program 34*b* described with reference to, for example, FIG. 5 and FIG. 8 also forms an embodiment. The control program 34*b* causes a computer to execute: a process for acquiring the process data X for the actually used controlled object 9; and, after converting the acquired process data X based on at least one of the target set value N and the parameters P for the actually used controlled object 9, a process for calculating the manipulated variable MV for the actually used controlled object 9 by use of the converted process data (the feature data S) and the trained model 2. The control program 34*b* of this kind can also enhance the versatility and practicality of the trained model 2 as described above. Furthermore, the recording medium having the control program 34*b* stored therein, which is described above with reference to, for example, FIG. 9, also forms an embodiment.

What is claimed is:

1. A controller comprising a processor configured to execute a process that includes:

acquiring process data for an actually used controlled object;

converting the acquired process data based on at least one of a target set value and parameters for the actually used controlled object; and outputting a manipulated variable for the actually used controlled object by inputting the converted process data into a trained model; and a Proportional-Integral-Differential controller configured to calculate a manipulated variable for the actually used controlled object, wherein upon receiving input of process data for a specific controlled object, the trained model outputs a manipulated variable for approximating process data for the specific controlled object to a specific target set value, and the parameters include parameters for specifying a relation between manipulated variables for the actually used controlled object and process data obtained by use of the manipulated variables, the trained model being trained using a target set value that may be the same or different from the specific target set value, wherein the process further includes: adjusting a mapping function and an inverse mapping function based on a ratio between at least one of the target set value and the parameters for the actually used controlled object and at least one of the specific target set value for the specific controlled object and the parameters for the specific controlled object, the inverse mapping function being an inverse function of the mapping function, and switching a control mode between a first control mode under which the manipulated variable calculated by the processor is fed to the actually used controlled object, and a second control mode under which the manipulated variable calculated by the Proportional-Integral-Differential controller is fed to the actually used controlled object, wherein the outputting the manipulated variable includes conversion of the acquired process data by use of the adjusted mapping function and inverse conversion of data that is calculated using the converted process data and the trained model, the inverse conversion being performed using the inverse mapping function of the mapping function.

2. A non-transitory computer-readable recording medium having stored therein a control program configured to cause a computer to execute:

acquiring process data for an actually used controlled object;

converting the acquired process data based on at least one of a target set value and parameters for the actually used controlled object; and calculating a manipulated variable for the actually used controlled object by use of the converted process data and a trained model, wherein outputting a manipulated variable for the actually used controlled object by inputting the converted process data into a trained model, wherein upon receiving input of process data for a specific controlled object, the trained model outputs a manipulated variable for approximating process data for the specific controlled object to a specific target set value, the trained model being trained using a target set value that may be the same or different from the specific target set value, and the parameters include parameters for specifying a relation between manipulated variables for the actually used controlled object and process data obtained by use of the manipulated variables, wherein the control program is further configured to execute: adjusting a mapping function and an inverse mapping function based on a ratio between at least one of the target set value and the parameters for the actually used controlled object and at least one of the specific target set value for the specific controlled object and the parameters for the specific controlled object, the inverse mapping function being an inverse function of the mapping function, and switching a control mode between a first control mode under which the manipulated variable calculated by a processor is fed to the actually used controlled object, and a second control mode under which a manipulated variable calculated by a Proportional-Integral-Differential controller is fed to the actually used controlled object, wherein the outputting the manipulated variable includes conversion of the acquired process data by use of the adjusted mapping function and inverse conversion of data that is calculated using the converted process data and the trained model, the inverse conversion being performed using the inverse mapping function of the mapping function.

3. A control method comprising:

acquiring process data for an actually used controlled object;

converting the acquired process data based on at least one of a target set value and parameters for the actually used controlled object; and outputting a manipulated variable for the actually used controlled object by inputting the converted process data into a trained model, wherein the trained model being trained using feature data representing a state of a process of a specific controlled object, wherein upon receiving input of process data for the specific controlled object, the trained model outputs a manipulated variable for approximating process data for the specific controlled object to a specific target set value, the trained model being trained using a target set value that may be the same or different from the specific target set value, and the parameters include parameters for specifying a relation between manipulated variables for the actually used controlled object and process data obtained by use of the manipulated variable, wherein the control method further comprises: adjusting a mapping function that maps the feature data with the process data, and an inverse mapping function based on a ratio between at least one of the target set value and the parameters for the actually used controlled object and at least one of the specific target set value for the specific controlled object and the parameters for the specific controlled object, the inverse mapping function being an inverse function of the mapping function, and wherein the outputting the manipulated variable includes conversion of the acquired process data by use of the adjusted mapping function and inverse conversion of data that is calculated using the converted process data and the trained model, wherein the manipulated variable is provided to control the actually used controlled object, the inverse conversion being performed using the inverse mapping function of the mapping function, wherein the control method further comprises controlling the actually used controlled object by using the provided manipulated variable.

4. The control method according to claim 3, wherein the manipulated variable is determined correspond to a highest evaluation value associated with the feature data.

5. The control method according to claim 3, wherein a control cycle, in which an acquisition unit acquires process data, is adjusted in proportion to value of a time constant included in the parameters.

6. The control method according to claim 3, wherein the feature data is associated with a coefficient, wherein the coefficient is adjusted based on at least one of the target set value and the parameters for the actually used controlled object and at least one of the specific target set value for the specific controlled object and the parameters for the specific controlled object.

7. The control method according to claim 3, wherein the feature data is associated with a coefficient, wherein the coefficient is adjusted based on a ratio between at least one of the target set value and the parameters for the actually used controlled object and at least one of the specific target set value for the specific controlled object and the parameters for the specific controlled object.

8. The control method according to claim 3, wherein the actually used controlled object comprises a water tank, the process data comprises a liquid surface level in the water tank, the manipulated variable comprises a degree of opening a valve.

9. The control method according to claim 3, wherein the parameters include at least one of input and output ranges and a process gain.

10. The control method according to claim 3, wherein the parameters include a time constant, the process further includes adjusting a control cycle based on the time constant included among the parameters, and the acquiring includes acquiring process data for the actually used controlled object in the adjusted control cycle.

11. The control method according to claim 3, wherein the process further includes performing learning for the trained model.

12. The control method according to claim 3, wherein the switching includes switching a control mode to a first control mode at a startup, and switching the control mode to a second control mode when the difference of process data and the target set value is lower than a threshold value.

* * * * *